UNITED STATES PATENT OFFICE.

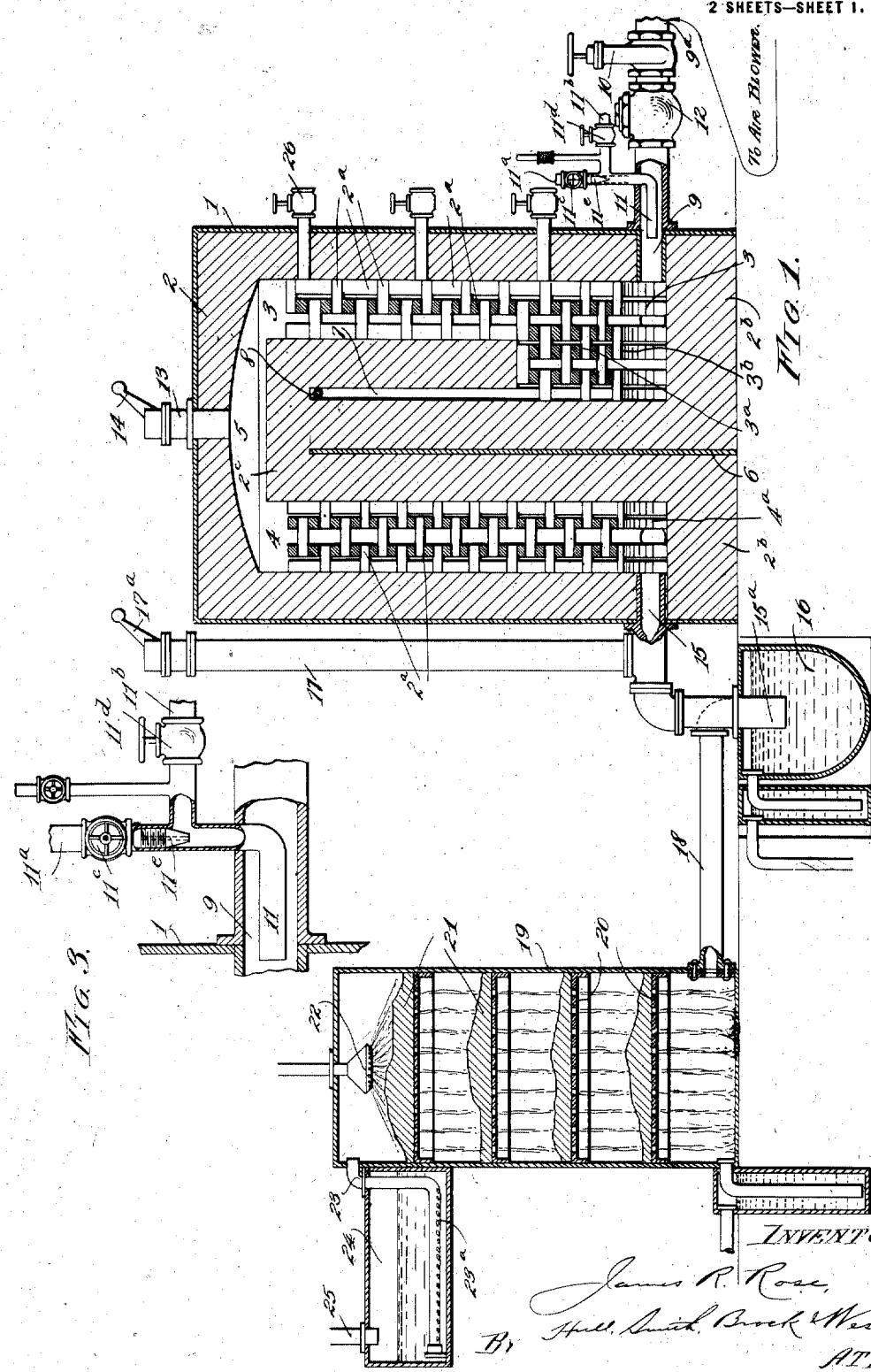

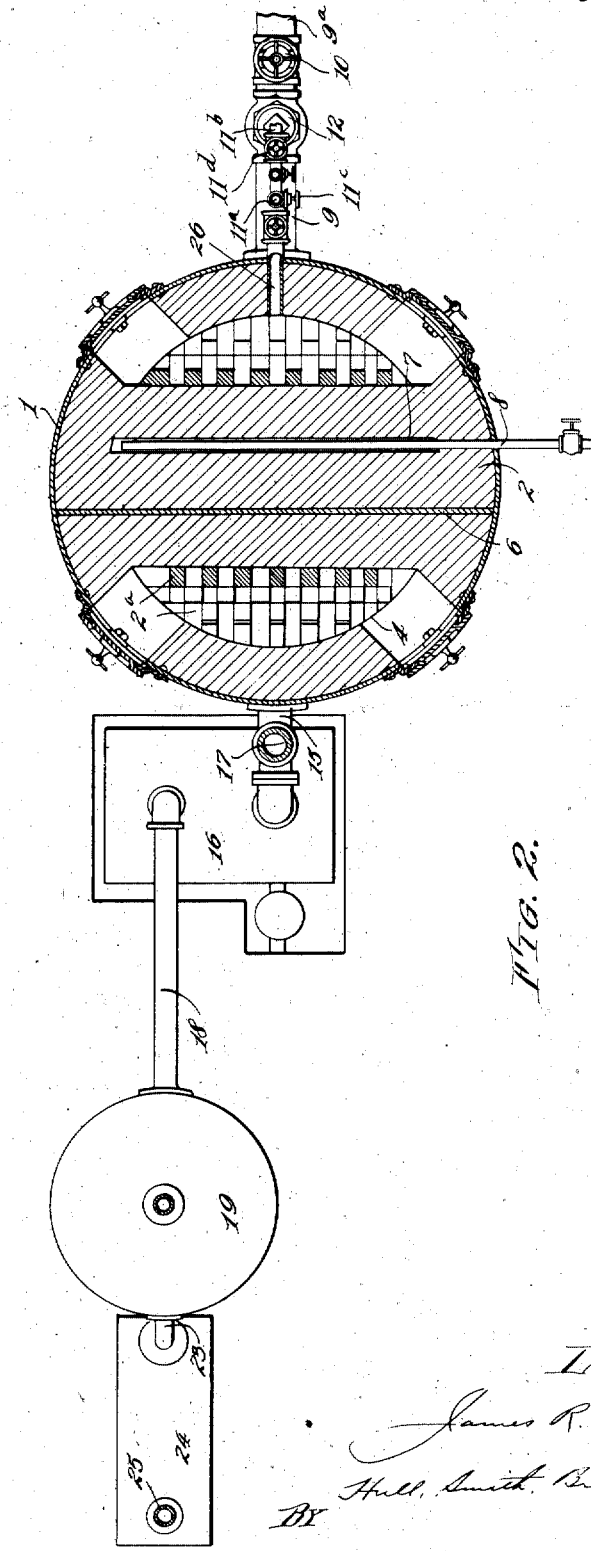

JAMES R. ROSE, OF EDGEWORTH, PENNSYLVANIA.

APPARATUS FOR PRODUCING COMBUSTIBLE FUEL.

1,252,032.  Specification of Letters Patent.  Patented Jan. 1, 1918.

Application filed November 29, 1915. Serial No. 64,100.

*To all whom it may concern:*

Be it known that I, JAMES R. ROSE, a citizen of the United States, residing at Edgeworth, in the county of Allegheny and State of Pennsylvania, have invented a certain new and useful Improvement in Apparatus for Producing Combustible Fuel, of which the following is a full, clear, and exact description, reference being had to the accompanying drawings.

This invention relates to an apparatus for manufacturing gaseous fuel, and more particularly to an apparatus for the production and enriching of such gaseous fuel as is suitable for the cutting and welding art. It is a general object of the invention to provide an apparatus capable of producing a fuel which shall be more efficient than those ordinarily employed heretofore and, more specifically, one which shall contain a relatively large proportion of the higher and richer members of the hydro-carbon series, whereby a gas of a high heating value will be obtained.

Further and more generally stated the invention may be defined as consisting of the combinations of elements embodied in the claims and illustrated in the drawings forming a part hereof.

Referring to the drawings, Figure 1 is a longitudinal vertical sectional view through an apparatus constructed in accordance with my invention for realizing the process and for producing the gaseous fuel aforesaid; Fig. 2 is a view, partly in section and partly in plan, of the apparatus shown in Fig. 1, the section corresponding to the line 2—2 of Fig. 1; and Fig. 3 an enlarged detail, partly in section and partly in elevation, of the connections for supplying fluids to the bottom of the apparatus.

Describing by reference characters the various parts illustrated herein, 1 denotes the outer shell and 2 the refractory lining and filler of a generator, which generator is shown as cylindrical. This refractory lining may be of any suitable well known material, and the generator is so constructed as to provide a front flue 3 and a rear flue 4 communicating at their upper ends by a transverse passageway 5, said passageway being formed within the said lining and filler. Refractory material $2^a$ is arranged in "checker-work" formation within the flues 3 and 4 as well as in the chamber $3^a$ at the bottom of the flue 3, which chamber is adapted to receive an enriching fluid in a manner to be described hereinafter.

It will be observed that the bottoms of the flues 3 and 4 and the bottom of the chamber $3^a$, are located a distance above the bottom of the generator body, whereby an ample thickness of refractory material $2^b$ is provided below such flues and chambers.

6 denotes a partition, preferably of sheet steel, extending transversely across the generator between the flue 3 and chamber $3^a$ and the flue 4 and extending from the bottom of the generator upwardly to a distance below the top of the refractory dividing wall $2^c$. This partition prevents seepage of gases from the flue and chamber on one side thereof to the flue on the opposite side thereof. 7 denotes a chamber extending upwardly from the inner or rear end of the chamber $3^a$, preferably substantially as high as the partition 6, and having in the upper portion thereof a spray pipe 8. 9 denotes an inlet connection pipe communicating with the front or charging wall of the generator 1 and discharging into the bottom of the chamber 3. This connection is provided at its outer end with a gate valve 10 and is extended, as indicated at $9^a$, to a suitable air blower (not shown). 11 denotes a nozzle through which a suitable preheating fluid (such as gas, or liquid hydro-carbon) mixed with air (if desired) may be introduced into the bottom of the flue 3 beneath the arch $3^b$. This nozzle preferably extends axially into the connection 9 and is adapted to receive gaseous and liquid fuel from the pipes $11^a$, $11^b$, respectively, each having a valve, indicated at $11^c$, $11^d$, respectively.

The flues 3, $3^a$ and the chamber 4 are provided with the checker work filling of refractory material referred to hereinbefore and indicated at $2^a$, while the transverse flue 5 is provided with an outlet connection 13 having a weighted blow-off or pressure-relief valve therein, the operating handle whereof is indicated at 14.

From the arch $4^a$ at the bottom of the flue 4 there extends an outlet flue 15, the discharge end of which projects into a receptacle 16, the lower end $15^a$ of such flue being sealed by suitable liquid within the receptacle. Projecting upwardly from the outlet flue 15 is a pipe 17 having a pressure-relief valve therein similar to the valve in the pipe 13, the operating handle of the valve being indicated at 17ª.

From the top of the receptacle 16 and having its inlet end above the liquid therein extends a pipe 18, which communicates with the bottom of the scrubbing tank 19, having a series of transverse, perforated partitions 20 therein with suitable porous material 21, such as pumice stone, on said partitions and a spraying nozzle 22 in the upper end thereof above the uppermost partition and the material thereon. From this scrubber a pipe 23 extends into a tank 24 which may contain a hydro-carbon liquid of one of the higher or richer series, the pipe 23 being provided with perforations 23ª beneath the top of the liquid in said tank whereby the gas discharged from the scrubber may be further enriched. From the enriching tank 24 a pipe 25 leads to a storage tank or to the point of use. From the front of the furnace 1, there project pipes or connections 26 which provide means for applying pyrometers to the flue 3 or for the application of instruments for estimating the temperature by observation, as by a color test.

In operation, gas (artificial or natural) or liquid hydro-carbon (such as crude or refined oil) is introduced into the bottom of the flue 3 and chamber 3ª, from the pipe 11ª or the pipe 11ᵇ, respectively, there being an injector nozzle 11ᵉ within the pipe 11ª in operative relation to the lateral branch extending from said pipe and to which the pipes 11ᵇ and 11ᶠ are connected whereby, if desired, the gas which is supplied through the pipe 11ª may be used in coöperation with either of the fluids supplied through the pipes 11ᵇ and 11ᶠ and, in the case of oil, assist in injecting the same. In the case of gas, the gas will be introduced under the ordinary city or tank pressure; in the case of oil, the fuel will be pumped or sprayed into the bottom of the chamber; in either case, the hydro-carbon fuel is mixed with air; where air is used it is preferably supplied through the pipe 9ª; or this same pipe may be employed for supplying steam. This mixture of hydro-carbon and air, being ignited, burns in contact with the refractory material 2ª in the flues 3 and 4 and the chamber 3ª until the desired temperature (not materially lower than 2200° F.) is attained, as indicated by the pyrometers or sight tubes. The products of combustion resulting from this preheating operation will escape through the upper end of the pipe 17, the valve being opened or lifted by its handle 17ª for the purpose of facilitating the discharge of such gases.

After the "blowing-up" or preheating operation, the fluid which is to be broken up and otherwise changed (preferably natural gas) will be introduced into the bottom of the front flue and chamber through the pipe 11ᶠ, said pipe being provided with the valve 11ᵍ. This fluid, coming into contact with the preheated refractory material, will, in its long and tortuous passage through the heated zone thus provided, be disassociated into carbon, hydrogen, and lighter members of the hydro-carbon series than those originally introduced. In order to enrich the gas thus produced, a liquid hydro-carbon, preferably a higher member of the series than that introduced into the bottom of the flue 3 and chamber 3ª, will now be sprayed into the chamber 7 through the pipe 8. This hydro-carbon will be more or less disassociated in the chamber 7, it being noted that the chamber 7 is located within the refractory core or filler of the generator and in such proximity to the flues 3 and 4 as to be heated thereby. Some of the solid carbon which will be produced will be carried through the generator and deposited in the trap 16. A large proportion of such solid carbon will, however, be deposited upon the refractory material and will be consumed during the next blowing-up or preheating operation, thus utilizing its heat of combustion in the production of the enriched gas in the generator.

Through the disassociation of the gas introduced through the nozzle 11, hydrogen in a nascent condition will be produced, along with a very small percentage of carbon monoxid produced by the oxygen remaining from the preheating operation wherein air has been used. This disassociation will ordinarily occur within the first eighteen inches of the vertical movement of the fluids in the flue 3 and chamber 3ª. On the other hand, the hydro-carbon introduced through the pipe 8 will be gradually broken up or disassociated as it descends the chamber 7 and traverses the chamber 3ª and flue 3. In its passage through the flues 3 and 4, it will, through the high temperature to which it is subjected in the long refractory lined passageway of the generator, be further disassociated and combined chemically with the fluid introduced through the nozzle 11. The final result of the chemical action in the generator under the conditions hereinbefore set forth will result in the production of a fixed gas having a higher heating value and requiring far less oxygen for its combustion than the fluid which was introduced through the nozzle 11. Where natural gas is used for the fluid fuel introduced through the nozzle 11 and crude oils for the liquid fuel discharged through the pipe 8, there will result, from the chemical action which takes place in the generator under the influence of the heat retained in the checker-work refractory material and that resulting from the combustion of the carbon deposited thereon, a gas which, when the lining is at substantially the temperature of 2200° F., will contain approximately 85% hydrogen, 10% gas of the $CH_4$ series and 5% of a gas of the $C_6H_6$ series.

The gas thus produced in the generator 1 will be conducted through the receptacle 16, which will trap any solid carbon that may be present and will then be conducted through the scrubbing tank 19 as explained heretofore, and may then be further enriched, if desirable, by being discharged into and through the hydro-carbon liquid in the enriching tank 24.

This hydro-carbon liquid in the tank 24 may be benzene, naphthalene, or any other volatile hydro-carbon of a sufficiently high series, and the resultant fluid will not separate or stratify when stored under pressure.

At the end of the operation, because of the disassociation of the hydro-carbon supplied through the nozzle 11 and pipe 8, a considerable quantity of solid carbon will be deposited upon the refractory material with which the generator chambers are supplied. This will furnish a material part of the combustible agent whereby the refractory material will be heated during the next "blowing-up" operation.

Where oil is employed in place of natural gas, it will be introduced through the pipe 8 and, in its transit through the generator, will be converted into a gas having the same proportions of hydrogen as before but with no gas of the $CH_4$ series, the resultant gas, according to the temperature in the generator, containing from 85% to 98% hydrogen and from 15% to 2% of a gas of the $C_6H_6$ series. The process which is realized in and through the operation of my apparatus in the manner described hereinbefore forms the subject matter of a separate application No. 98,552 filed May 19, 1916.

Having thus described my invention, what I claim is:—

1. A generator of the character set forth comprising a pair of spaced flues having refractory material therein, said flues being connected by a passageway, a connection for combustible fluid arranged to discharge into one of said flues at a point remote from said passageway, a chamber arranged in proximity to one of said flues to be heated thereby and communicating with the last mentioned flue, and means for supplying a hydro-carbon fluid to said chamber.

2. A generator of the character set forth comprising a pair of spaced flues having refractory material therein, said flues being connected by a passageway, a connection for combustible fluid arranged to discharge into one of said flues at a point remote from said passageway, a chamber arranged in proximity to one of said flues to be heated thereby and communicating with the last mentioned flue at a point intermediate the passageway and the point at which the connection for combustible fluid communicates with said flue, and means for supplying a hydro-carbon fluid to said chamber.

3. A generator of the character set forth comprising a pair of vertically extending spaced flues having refractory material therewithin, said flues being connected at adjacent ends by a transverse passageway, a connection for combustible fluid communicating with one of said flues adjacent the end opposite said passageway, a chamber arranged in heating relation to one of said flues and communicating with the last mentioned flue at a point intermediate the ends thereof, and means for supplying a liquid hydro-carbon to said chamber.

4. In a generator of the character set forth, the combination of a casing having a filling of refractory material therewithin, a pair of parallel flues within said filling and each having refractory material therewithin and connected at adjacent ends by a transverse passageway within said filling, a connection for combustible fluid communicating with the end of one of said flues which is opposite said passageway, a chamber interposed between said flues and within said filling and extending substantially parallel to said flues and communicating with the last mentioned flue intermediate of the ends thereof, and a supply of liquid hydro-carbon communicating with said chamber.

5. In a generator of the character set forth, the combination of a casing having a filling of refractory material therewithin, a pair of parallel flues within said filling and having refractory material in checker-work formation therewithin and connected at adjacent ends by a transverse passageway within said filling, one of said flues having a chamber at the end opposite said passageway and said chamber having refractory material therewithin, a chamber interposed between said flues and extending from the first-mentioned chamber in a direction substantially parallel to said flues, and a supply for liquid hydro-carbon communicating with the last mentioned chamber at a point remote from the first-mentioned chamber.

6. A generator of the character set forth comprising a pair of vertically extending flues communicating at their upper ends by a passageway, one of said flues having at its lower end a laterally extending chamber, there being a chamber extending vertically from the last mentioned chamber and the said flues and the first-mentioned chamber having refractory material providing tortuous passageways therewithin, connections for supplying a combustible fluid to said vertical flues, and a hydro-carbon supply pipe located in the second chamber at a point remote from the first chamber.

7. In a generator, the combination of a casing, a refractory filler therewithin, a pair of vertically extending flues within said filler and communicating at their upper ends by a transverse passageway, a laterally projecting chamber at the bottom of one of said flues, said flues and said chamber having refractory material therewithin, a second chamber extending upwardly from the first-mentioned chamber within said filler, means for supplying liquid hydro-carbon to the second chamber at a point remote from the first-mentioned chamber, and a connection for combustible fluid communicating with the bottom of the flue having the first-mentioned chamber.

8. In a generator of the character set forth, the combination of a pair of vertically extending flues, connected at their upper ends by a transverse passageway, there being a chamber at the bottom of one of said flues, said flues and said chamber having refractory material therewithin, a second chamber extending upwardly from the first-mentioned chamber and in position to be heated by one of said flues, and a source of hydrocarbon supply communicating with the second chamber at a point remote from the first-mentioned chamber.

In testimony whereof, I hereunto affix my signature.

JAMES R. ROSE.